United States Patent [19]
Trotter et al.

[11] 4,288,358
[45] * Sep. 8, 1981

[54] BLENDS OF PROPYLENE/1-BUTENE OR 1-PENTENE/HIGHER α-OLEFIN COPOLYMERS, COMPATIBLE TACKIFYING RESINS AND PLASTICIZING OILS USEFUL AS HOT-MELT, PRESSURE-SENSITIVE ADHESIVES

[75] Inventors: Jimmy R. Trotter; Richard L. McConnell; Frederick B. Joyner, all of Kingsport, Tenn.

[73] Assignee: Eastman Kodak Company, Rochester, N.Y.

[*] Notice: The portion of the term of this patent subsequent to Sep. 25, 1996, has been disclaimed.

[21] Appl. No.: 71,419

[22] Filed: Aug. 30, 1979

[51] Int. Cl.³ .................. C08K 5/10; C08L 23/12
[52] U.S. Cl. .................. 260/31.8 M; 260/33.6 PQ; 525/191; 525/210; 525/216; 525/232; 428/411
[58] Field of Search .................. 260/33.6 PQ, 31.8 M, 260/31.8 HR, 31.8 PQ, 31.8 W, 31.8 J, 31.8 B, 31.8 H; 525/191, 211, 216, 232, 240, 210

[56] References Cited

U.S. PATENT DOCUMENTS

| | | | |
|---|---|---|---|
| 4,066,600 | 1/1978 | Pletcher | 260/30.6 R |
| 4,072,735 | 2/1978 | Ardemagni | 525/177 |
| 4,120,916 | 10/1978 | Meyer, Jr. | 525/240 |
| 4,169,116 | 9/1979 | Trotter | 525/210 |

*Primary Examiner*—C. A. Henderson
*Attorney, Agent, or Firm*—Clyde L. Tootle; Daniel B. Reece, III

[57] ABSTRACT

This invention relates to blends of plasticizing oils and compatible tackifiers with olefin copolymers containing propylene, either 1-butene or 1-pentene and 3 to 14 mole percent of at least one $C_6$ to $C_{10}$ linear α-olefin which are useful as hot-melt, pressure-sensitive adhesives. The unmodified copolymer base resins have melt viscosities in the range of 10,000 cp up to about 1,000,000 cp at 190° C. The addition of the plasticizing oils and compatible tackifiers to the copolymer base resin causes a dramatic and unexpected increase in the shear adhesion failure time in addition to improved coatability as well as substantial increases in probe tack and peel adhesion values of the copolymers.

16 Claims, No Drawings

BLENDS OF PROPYLENE/1-BUTENE OR 1-PENTENE/HIGHER α-OLEFIN COPOLYMERS, COMPATIBLE TACKIFYING RESINS AND PLASTICIZING OILS USEFUL AS HOT-MELT, PRESSURE-SENSITIVE ADHESIVES

This invention relates to hot melt pressure sensitive adhesive compositions having a novel combination of properties. More specifically, the invention relates to blends of plasticizing oils and compatible tackifiers with olefin copolymers containing propylene, 1-butene or 1-pentene and 3 to 14 mole percent of at least one $C_6$ to $C_{10}$ linear α-olefin which are useful as hot-melt, pressure-sensitive adhesives.

Pressure-sensitive adhesives that have good tack and adhere to numerous substrates are widely used by industry in various applications such as in consumer products. For example, one such application is in the construction of floor tiles having a preapplied adhesive for the do-it-yourself market. In this application the pressure-sensitive adhesive is thinly coated onto the undersurface of floor tiles and covered with a protective release sheet. Installation of the floor tiles is accomplished by removing the release sheet and pressing the tile into place. The pressure-sensitive adhesives presently used in this type application contain either a styrene-butadiene rubber or a styrene-isoprene rubber. Although these pressure-sensitive adhesives provide adequate adhesive properties, they have certain deficiencies that limit their usefulness. These adhesives have poor resistance to plasticizer migration and consequently in applications such as use on floor tiles allow the plasticizer in the tile to migrate into the adhesive thereby causing the adhesive to soften and string excessively. These prior adhesives also have poor heat stability as evidenced by an excessive change in viscosity when exposed to a temperature of 350° F. (the application temperature) for 24 hours. Another disadvantage of these prior adhesives is that they are expensive to produce because of the large amounts of rubber required in the composition to obtain adequate adhesive properties. Therefore, it would be an advance in the state of the art to have a hot-melt pressure-sensitive adhesive that has good adhesive properties without the disadvantages associated with prior pressure-sensitive adhesives.

In accordance with the present invention, blends comprising plasticizing oils and compatible tackifiers with an olefin copolymer containing 10 to 65 mole % propylene, 15 to 75 mole % 1-butene or 1pentene and 3 to 14 mole percent of at least one $C_6$ to $C_{10}$ linear α-olefin are useful as hot-melt, pressure-sensitive adhesives.

Operable plasticizing oils include paraffinic/naphthenic oils such as Shellflex 371, Tuflo 6204 and Kaydol oils, abietol, low molecular weight oils derived from a $C_5$ hydrocarbon fraction such as Wingtack 10, low molecular weight polyisobutylenes such as Indopol H-100, polymerized DAC-B oils such as Plasticizer H, and liquid polyterpenes such as Piccolyte S-10. Also operable are esters derived from either aromatic or aliphatic acids which have a boiling point of greater than about 275° C. at 760 mm pressure. Useful esters include materials such as tris(2-ethylhexyl) trimellitate, bis(2-ethylhexyl) phthalate, bis(2-ethylhexyl) terephthalate, dibutyl sebacate, bis(2-ethylhexyl) adipate, 2,2,4-trimethyl-1,3-pentanediol diisobutyrate, methyl abietate, and the like. Operable concentrations of these plasticizing oils range from about 1 to about 25 weight percent while the preferred range is about 5 to about 15 weight percent.

The compatible tackifying resin useful in the adhesive compositions of this invention include DAC-B hydrocarbon resin prepared according to the process disclosed in U.S. Pat. No. 3,701,760 as well as other hydrocarbon resins, polyterpenes or synthetic polyterpenes, and the like. One such hydrocarbon tackifying resin is a hydrocarbon resin having a softening point of about 100° C. and available commercially as Resin H-100 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a Ring and Ball softening point of from about 80° C. to about 135° C.; an acid number of from about 0-2, a saponification value of less than about 1; and an iodine value of from about 30 to 100. Examples of such commercially available resins based on a $C_5$-olefin fraction of this type are "Wingtack" 95 and "Wingtack" 115 tackifying resins sold by Goodyear Tire and Rubber Company. Other operable hydrocarbon tackifiers include the Sta-Tac and Betaprene A or H resins sold by Reichhold Chemical Corporation, Arkon resins sold by Arakawa Forest Chemical Industries, and Escorez resins sold by Exxon Chemical Co.

Also other suitable resins are the terpene polymers such as the polymeric, resinous materials obtained by polymerization and/or copolymerization of terpene hydrocarbons such as the alicyclic, monocyclic, and bicyclic monoterpenes and their mixtures, including alloocimene, carene, isomerized pinene, pinene, dipentene, terpinene, terpinolene, limonene, turpentine, a terpene cut or fraction, and various other terpenes. Particularly useful starting materials are terpene mixtures containing at least 20 percent beta-pinene and/or limonene or dipentene (racemic limonene), and the "sulfate turpentine" obtained as a by-product in the sulfate pulping process. Commercially available resins of the terpene type include the Zonarez terpene B-Series and 7000 Series resins from Arizona Chemical Corp. and Nirez resins from Reichhold Chemical Corp. The typical properties reported for the Zonarez terpene resins include Ring and Ball softening points of about 55° to 125° C. (ASTM E-28-67), color of 2 to 3 (Gardner 1963, 50% in heptane), acid number of less than 1 (ASTM D465-59), saponification number of less than 1 (ASTM D464-59) and specific gravity at 25° C. of 0.96 to 0.99 (ASTM D1963-61).

The hydrocarbon resins, polyterpenes, or other compatible tackifying resins can be used either alone or in combination. The operable concentration of these tackifiers is about 1 to about 60 weight percent tackifier. The preferred concentration range for these compatible tackifiers is about 10 to about 50 weight percent. Incompatible tackifiers such as those based on wood rosin esters or polyindene are not useful in the practice of this invention since blends containing them are grainy and hazy. Furthermore, the presence of the incompatible tackifiers reduces the tack of the copolymers, often to a very low level.

The base copolymers for the blends of this invention may be made according to the general procedure described in U.S. Pat. No. 3,954,697. Operable melt viscosity limits for these copolymers include 10,000 cp up to about 1,000,000 cp, with the preferred melt viscosity range being 15,000 cp to about 850,000 cp at 190° C. Such copolymers contain 3-14 mole percent higher-1-olefin and some may have a small amount of crystallinity. Generally, the weakly crystalline copolymers which are operable have heats of fusion of ≦5 calories/gram as measured on samples which have been annealed in an oven at 70° C. for periods of about 2 to 24 hours.

The "apparent heat of fusion" ($\Delta H_f$) of a polymer, as defined here, is the total amount of latent heat in cal./gram involved in the melting of all crystalline phases of a crystallizable polymer. $\Delta H_f$ values are readily obtained using thermal analytical instruments, such as the Perkin-Elmer DSC-2 Differential Scanning Calorimeter or the Du Pont Model 990 Thermal Analyzer with differential scanning calorimeter cell. One method for determining $\Delta H_f$ is described in the *Journal of Applied Polymer Science*, 20, 1209 (1976). Measurement of $\Delta H_f$ is also described in Du Pont Thermal Analysis Bulletin No. 900-8 (1965). Qualitatively, it is possible to compare the degree of crystallinity of polymers by comparing their $\Delta H_f$ values.

Glass transition values ($T_g$) of the copolymers generally range from about −18° to about −30° C.

Copolymers useful in the practice of this invention are readily prepared using titanium trichloride based catalysts. In general, preferred results have been achieved by using catalyst systems which provide poor stereoregulation in the polymerization of propylene or 1-butene. Combinations of $Et_3Al$ with $AATiCl_3$ with Al/Ti molar ratios ranging from about 1:1 to 5:1 have been found to be quite useful. It is also generally desirable to conduct the polymerization at relatively high temperatures such as from about 110° to about 170° C.

The following test methods are the ones used to evaluate the hot-melt, pressure-sensitive adhesives of this invention.

1. The melt viscosities of the adhesives are determined according to ASTM Procedure D1238 or in a Brookfield Thermosel Viscometer made by Brookfield Engineering Laboratores, Inc.

2. The glass transition temperatures of the adhesives are determined using a differential scanning calorimeter (Perkin-Elmer DSC-2 instrument) operating over the range of −70° C. to +200° C.

3. The probe tack values of the coated tapes are determined according to the method as described by Testing Machines, Inc., Amityville, New York, the manufacturer of the Polyken Probe Tack Tester (Model TMI80-2). The probe tack values are determined at 23° C. with the Polyken Probe Tack Tester using a 0.5 cm diameter probe, 100 $g/cm^2$ contact pressure, two-second contact time, and 2 cm/second separation speed.

4. The 180° peel adhesion values of the coated tapes are determined according to the Pressure Sensitive Tape Council's PSTC-1 test. The amount of adhesive residue left on the stainless steel testing panels when the bonds are tested is also noted.

5. The shear adhesion failure times of the coated tapes are determined according to the Pressure Sensitive Tape Council's PSTC-7 test.

6. The thermal stabilities of the adhesives are determined by heating the adhesives to 177° C. in the presence of air for 24 hours in a Brookfield Thermosel viscometer. As a measure of thermal stability, the melt viscosities of the adhesives are determined with the viscometer at 177° C. after 1, 4, 8, 12 and 24 hours and differences from the initial melt viscosity are noted. Char and film formation are also noted.

7. The compatibilities of the various base polymers with the tackifying resins (and plasticizing oils) are determined by melting samples of each blend between glass microscope slides on a Mettler hot stage attachment for a microscope. The temperature of the melt is raised to about 150° C., photomicrographs are made, and phase separation (if any) is noted.

8. Heat of fusion by Differential Scanning Calorimetry. Unpredicted and surprising advantages are obtained when compatible tackifiers and plasticizing oils are used as modifiers according to the teachings of this invention. For example, the addition of compatible tackifiers and plasticizing oils to substantially amorphous or semicrystalline olefin copolymers of propylene with at least one α-olefin selected from 1-butene and 1-pentene and at least one higher α-olefin of 6 to 10 carbon atoms and having a melt viscosity of about 10,000 to 1,000,000 cp at 190° C. provides adhesives having unexpectedly high probe tack and peel adhesion values relative to unmodified copolymers of comparable melt viscosities. It should be noted that the values obtained will depend somewhat on the degree of homogenization of the blend as well as on the thickness and smoothness of the polymer coating. Thus, the pressure-sensitive properties of the blends of this invention may vary by as much as 10–25% depending on the blend method and on the quality of the coating.

The pressure-sensitive adhesive compositions of this invention are prepared by blending together the compatible tackifiers and plasticizing oils with the copolymers in the melt at a temperature of about 160° C. to about 200° C. until a homogeneous blend is obtained. Various methods of blending materials of this type are known to the art and any method that produces a homogeneous blend is satisfactory. These components blend easily in the melt and a heated vessel equipped with a stirrer is all that is required. For example, simple melt tanks with anchor stirrers, Cowles Dissolvers, twin-screw extrusion equipment, Brabender Plastographs, and the like provides an effective mixing means for preparing these hot-melt pressure-sensitive adhesive compositions.

In addition to the polyolefin, tackifier and plasticizing oil, it is desirable for the hot-melt pressure-sensitive adhesive composition to contain about 0.1 to about 1.5 percent by weight, preferably about 0.25 percent to 1.0 percent by weight, of one or more stabilizers or antioxidants. Antioxidants that are effective for each of the various components can be used. Such antioxidants include, for example, "Ionox" 220 and 330 [tris(di-t-butyl-p-hydroxybenzyl)-trimethylbenzene], "Dalpac" 4C2 [2,6-di-(t-butyl)-p-cresol], "Naugawhite" (alkylated bisphenol), "Butyl Zimate" (zinc dibutyl dithiocarbamate), and "Ethyl" 702 [4,4'-methylene bis(2,6-di-tert-butylphenol)]. A particularly effective antioxidant is Irganox 1010 which is identified as pentaerythritol tetrakis[3-(3,5-di-tert-butyl-4-hydroxyphenyl)propionate].

There are numerous uses for the pressure-sensitive adhesives of the present invention. One such use is in the construction of women's sanitary napkins. A strip of the pressure-sensitive adhesive may be applied to the polyethylene shield of the napkin and then protected by a release sheet. At the time of use, the release sheet is removed and the napkin is held in place by adhering the pressure-sensitive adhesive to the undergarment, thus eliminating the need for belts and pins. Removal of the napkin is quick as it strips cleanly from the garment.

Another use of the adhesives of this invention is in the construction of floor tiles having a preapplied adhesive for the do-it-yourself market. The pressure-sensitive adhesive is thinly coated onto the undersurface of such floor tiles and covered with a protective release sheet. Quick and permanent installation of the floor tiles is accomplished by removing the release sheet and pressing the tile into place. This technique of installing floor tiles can be extended to other types of coverings such as wall tiles and ceiling tiles. Other major uses for the pressure-sensitive adhesives include their use on tapes and labels.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Poly(52-propylene-co-48-[1-butene]) [20 g; 124,300 cp at 190° C. by ASTM D1238 using a Tinius Olsen Melt Indexer with an 0.04-inch orifice and 2160 g weight], 16 g of Wingtack 95 tackifying resin (a synthetic polyterpene hydrocarbon type tackifying resin based on a $C_5$ olefin fraction; Ring and Ball softening point = 100°±5° C., iodine number = 30, specific gravity = 0.93); 4 g of Shellflex 371 plasticizing oil; and 0.1 g of Irganoz 1010 antioxidant (pentaerythritol tetrakis]3-(3,5-diterbutyl-4-hydroxyphenyl)propionate]) are melt blended at 200° C. for 30 minutes under an atmosphere of nitrogen in a large glass tube fitted with a mechanical stirrer. The clear compatible blend is removed from the glass tube and allowed to cool to 23° C. The melt viscosity of the blend is 21,750 cp at 177° C. When measured with a Brookfield Thermosel Viscometer using spindle SC4-27.

The blend is coated from the melt (177° C.) 0.001±0.0002 inch thick onto Mylar film (0.001 inch thick) using a heated doctor blade. Although the resulting coatings are quite tacky immediately after the coating operation, no measurable tack is detectable with a Polyken Probe Tack Tester after the coatings are aged for 24 hours at 23° C. Since the coatings do not have permanent tack, they are not useful as pressure-sensitive adhesive tapes. This example shows that the propylene/1-butene copolymer containing no higher α-olefin is not a useful base material for providing blends with permanent tack.

EXAMPLE 2

The procedure of Example 1 is repeated except that 20 g of poly[50-propylene-co-44-(1-butene)-co-6-(1-hexene)] having a melt viscosity of 247,250 cp at 190° C. is blended with 16 g of Wingtack 95 and 4 g of Shellflex 371 oil to prepare a blend having a melt viscosity of 38,000 cp at 177° C. (by Brookfield thermosel method). Pressure-sensitive tapes made with this blend have a probe tack value of 626 g/0.5 cm diameter probe, a peel adhesion value of 5.4 pounds/inch, and a shear adhesion failure time of >100 hours. These measurements are made after the tapes are aged for 24 hours at 23° C. Similar values are obtained after tapes are aged for one week and one month at 23° C.

EXAMPLE 3

The procedure of Example 1 is repeated except that 20 g of poly[56-propylene-co-35-(1-butene)-co-9(1-hexene)] having a melt viscosity of 221,670 cp at 190° C. is melt blended with 16 g of Wingtack 95 resin and 4 g of Shellflex 371 oil to provide a blend with a melt viscosity of 38,500 cp at 177° C. (by Brookfield Thermosel method). Pressure-sensitive tapes made with this blend have a probe tack value of 979 g/0.5 cm diameter probe, a peel adhesion value of 5.7 pounds/inch, and a shear adhesion failure time of 94 hours.

EXAMPLE 4

The procedure of Example 1 is repeated except that 20 g of poly[48-propylene-co-38-1-butene-co-14-(1-hexene)] having a melt viscosity of 248,620 cp at 190° C. by (ASTM D1238) is melt blended with 16 g of Wingtack 95 resin and 4 g Shellflex 371 oil to provide a blend with a melt viscosity of 39,500 cp at 190° C. (by Brookfield Thermosel method). Pressure sensitive tapes made from this blend have a probe tack value of 1102 g/0.5 cm diameter probe, peel adhesion value of 5.2 pounds/inch, and a shear adhesion failure time of 26 hours.

EXAMPLE 5

The procedure of Example 1 is repeated except that 20 g of a poly[63-propylene-co-37-(1-butene)] having a melt viscosity of 18,750 cp at 190° C. (by ASTM D1238), a Tg value of −16° C., and an endotherm at 49° C. measured by DSC ($\Delta H_f = 5.4$ cal./g.) is blended with 16 g of Wingtack 95 tackifying resin and 4 Shellflex 371 plasticizing oil to provide a blend having a melt viscosity of 2,410 cp at 177° C. (by Brookfield Thermosel method). Coatings made with this blend have no measurable probe tack after ageing 24 hours at 23° C. This example shows that low-viscosity propylene/1-butene copolymers which contain no higher α-olefin do not provide blends with permanent pressure-sensitive tack.

EXAMPLE 6

The procedure of Example 1 is repeated except that 20 g of poly[57-propylene-co-39-(1-butene)-co-4-(1-hexene)] having a melt viscosity of 18,750 cp at 190° C. (by ASTM D1238), a Tg value of −18° C. and an endotherm at 46° C. by DSC ($\Delta H_f = 2.8$ cal./g.) is blended with 16 g of Wingtack 95 tackifying resin and 4 g of Shellflex 371 plasticizing oil to provide a blend having a melt viscosity of 1800 cp at 177° C. (by Brookfield Thermosel method). Pressure-sensitive tapes made with this blend have a probe tack value of 732 g/0.5-cm diameter probe and a peel adhesion value of 6.5 pounds/inch after the tapes are aged for 24 hours at 23° C. Similar values are observed after the tapes are aged for one week and one month at 23° C.

EXAMPLE 7

The procledure of Example 1 is repeated except that 20 g of poly[52-propylene-co-41-(1-butene)-co-7-(1-hexene)] having a melt viscosity of 24,190 cp at 190° C. (by ASTM D1238), a Tg value of −19° C. and an endotherm at 46° C. by DSC ($\Delta H_f = 2.5$ cal./g.) is blended with 16 g of Wingtack 95 tackifying resin and 4 g of Shellflex 371 plasticizing oil to provide a blend having a melt viscosity of 3100 cp at 177° C. (by Brookfield Thermosel method). Pressure-sensitive tapes made with this blend have a probe tack value of 1046 g/0.5-cm diameter probe and a peel adhesion value of 6.4 pounds/inch.

EXAMPLE 8

The procedure of Example 1 is repeated except that 20 g of poly[43-propylene-co-43-(1-butene)-co-14-(1-hexene)] having a melt viscosity of 32,140 cp at 190° C. (by ASTM D1238) is blended with 4 g of Wingtack 95 tackifying resin and 4 g of Shellflex 371 plasticizing oil to prepare a blend having a melt viscosity of 2250 cp at 177° C. (by Brookfield Thermosel method). Pressure-sensitive tapes made with this blend have a probe tack value of 1242 g/0.5 cm diameter probe and a peel adhesion value of 5.5 pounds/inch after the tapes are aged for 24 hours at 23° C.

EXAMPLE 9

The procedure of Example 1 is repeated except that 20 g. of poly[50-propylene-co-36-(1-butene)-co-14-(1-octene)] having a melt viscosity of 290,000 cp at 190° C. (by ASTM D1238 method) is blended with 16 g of Wingtack 95 tackifying resin, and 4 g of Shellflex 371 plasticizing oil to prepare a blend having a melt viscosity of 46,000 cp at 177° C. (by Brookfield Thermosel method). Pressure-sensitive tapes made with this blend have a probe tack value of 860 g./0.5 cm diameter probe and a peel adhesion vaue of 4.9 pounds/inch.

EXAMPLE 10

The procedure of Example 1 is repeated except that 20 g. of poly[45-propylene-co-43-(1-butene)-co-12-(1-decene)] having a melt viscosity of 245,000 cp at 190° C. (by ASTM D1238 method) is blended with 16 g of Wingtack 95 tackifying resin, and 4 g of Tufflo 6204 plasticizing oil to prepare a blend having a melt viscosity of 41,000 cp at 177° C. (by Brookfield Thermosel method). Pressure-sensitive tapes made with this blend have a probe tack value of 830 g./0.5 cm diameter probe and a peel adhesion value of 4.5 pounds/inch.

EXAMPLE 11

The procedure of Example 1 is repeated except that 20 g. of poly[60-propylene-co-28-(1-butene)-co-7-(1-hexene)-co-5-(1-octene)] having a melt viscosity of 210,000 cp at 190° C. (by ASTM D1238 method) is blended with 16 g of Zonarez 7100 tackifying resin, and 4 g of Wingtack 10 plasticizing oil to prepare a blend having a melt viscosity of 31,000 cp at 177° C. (by Brookfield Thermosel method). Pressure-sensitive tapes made with this blend have a probe tack value of 930 g./0.5 cm diameter probe and a peel adhesion value of 5.3 pounds/inch.

EXAMPLE 12

The procedure of Example 1 is repeated except that 20 g. of poly[15-propylene-co-75-(1-butene)-co-10-(1-hexene)] having a melt viscosity of 750,000 cp at 190° C. (by ASTM D1238 method) is blended with 16 g of Eastman Resin H-100 tackifying resin, and 4 g of Shellflex 371 plasticizing oil to prepare a blend having a melt viscosity of 105,000 cp at 177° C. (by Brookfield Thermosel method). Pressure-sensitive tapes made with this blend have a probe tack value of 880 g./0.5 cm diameter probe and a peel adhesion value of 4.9 pounds/inch.

EXAMPLE 13

The procedure of Example 1 is repeated except that 20 g. of poly[65-propylene-co-27-(1-butene)-co-8-(1-hexene)] having a melt viscosity of 15,000 cp at 190° C (by ASTM D1238 method) is blended with 16 g of Wingtack 95 tackifying resin, and 4 g of Kaydol plasticizing oil to prepare a blend having a melt viscosity of 2100 cp at 177° C. (by Brookfield Thermosel method). Pressure-sensitive tapes made with this blend have a probe tack value of 750 g./0.5 cm diameter probe and a peel adhesion value of 4.2 pounds/inch.

EXAMPLE 14

The procedure of Example 1 is repeated except that 10 g of poly[58-propylene-co-30-(1-butene)-co-12-(1-hexene)] having a melt viscosity of 950,000 cp at 190° C. (by ASTM D1238 method) is blended with 24 g of Wingtack 95 tackifying resin, and 6 g of Shellflex 371 plasticizing oil to prepare a blend having a melt viscosity of 72,000 cp at 177° C. (by Brookfield Thermosel method). Pressure-sensitive tapes made with this blend have a probe tack value of 510 gl./0.5 cm diameter probe and a peel adhesion value of 2.8 pounds/inch.

EXAMPLE 15

The procedure of Example 1 is repeated except that 20 g. of poly[34-propylene-co-60-(1-butene)-co-6-(1-hexene)] having a melt viscosity of 105,000 cp at 190° C. (by ASTM D1238 method) is blended with 16 g of Wingtack 95 tackifying resin, and 4 g of Kodaflex TOTM plasticizing oil to prepare a blend having a melt viscosity of 26,000 cp at 177° C. (by Brookfield Thermosel method). Pressure-sensitive tapes made with this blend have a probe tack value of 1040 g./0.5 cm diameter probe and a peel adhesion value of 5.4 pounds/inch.

EXAMPLE 16

The procedure of Example 1 is repeated except that 20 g. of poly[49-propylene-co-43-(1-pentene)-co-8-(1-hexene)] having a melt viscosity of 510,000 cp at 190° C. (by ASTM D1238 method) is blended with 16 g of Wingtack 95 tackifying resin, and 4 g of methyl abietate to prepare a blend having a melt viscosity of 73,000 cp at 177° C. (by Brookfield Thermosel method). Pressure-sensitive tapes made with this blend have a probe tack value of 990 g./0.5 cm diameter probe and a peel adhesion value of 5.7 pounds/inch.

EXAMPLE 17

The procedure of Example 1 is repeated except that 30 g. of poly[56-propylene-co-35-(1-butene)-co-9-(1hexene)] having a melt viscosity of 247,250 cp at 190° C. (by ASTM D1238 method) is blended with 2 g of Wingtack 95 tackifying resin, and 8 g of Shellflex 371 plasticizing oil to prepare a blend having a melt viscosity of 56,000 cp at 177° C. (by Brookfield Thermosel method). Pressure-sensitive tapes made with this blend have a probe tack value of 890 g./0.5 cm diameter probe and a peel adhesion value of 5.2 pounds/inch.

EXAMPLE 18

The procedure of Example 1 is repeated except that 22 g of poly[56-propylene-co-35-(1-butene)-co-9-(1-hexene)] having a melt viscosity of 247,250 cp at 190° C. (by ASTM D1238 method) is blended with 10 g of Wingtack 95 tackifying resin, and 8 g of Shellflex 371 plasticizing oil to prepare a blend having a melt viscosity of 8800 cp at 177° C. (by Brookfield Thermosel method). Pressure-sensitive tapes made with this blend have a probe tack value of 940 g./0.5 cm diameter probe and a peel adhesion value of 6.4 pounds/inch.

EXAMPLE 19

The procedure of Example 1 is repeated except that 10 g. of poly[56-propylene-co-35-(1-butene)-co-9-(1-hexene)] having a melt viscosity of 247,250 cp at 190° C. (by ASTM D1238 method) is blended with 22 g of Wingtack 95 tackifying resin, and 8 g of Shellflex 371 plasticizing oil to prepare a blend having a melt viscosity of 1500 cp at 177° C. (by Brookfield Thermosel method). Pressure-sensitive tapes made with this blend have a probe tack value of 1020 g./0.5 cm diameter probe and a peel adhesion value of 6.1 pounds/inch.

EXAMPLE 20

The procedure of Example 1 is repeated except that 16 g. of poly[56-propylene-co-35-(1-butene)-co-9-(1-hexene)] having a melt viscosity of 247,250 cp at 150° C. (by ASTM D1238 method) is blended with 22 g of Wingtack 95 tackifying resin, and 2 g of Shellflex 371 plasticizing oil to prepare a blend having a melt viscosity of 21,000 cp at 177° C. (by Brookfield Thermosel method). Pressure-sensitive tapes made with this blend have a probe tack value of 790 g./0.5 cm diameter probe and a peel adhesion value of 4.5 pounds/inch.

EXAMPLE 21

The procedure of Example 1 is repeated except that 28 g. of poly[56-propylene-co-35-(1-butene)-co-9-(1-hexene)] having a melt viscosity of 247,250 cp at 190° C. (by ASTM D1238 method) is blended with 10 g of Wingtack 95 tackifying resin, and 2 g of Shellflex 371 plasticizing oil to prepare a blend having a melt viscosity of 64,000 cp at 177° C. (by Brookfield Thermosel method). Pressure-sensitive tapes made with this blend have a probe tack value of 610 g./0.5 cm diameter probe and a peel adhesion value of 3.1 pound/inch.

EXAMPLE 22

The procedure of Example 1 is repeated except that 36 g. of poly[56-propylene-co-35-(1-butene)-co-9-(1-hexene)] having a melt viscosity of 75,000 cp at 190° C. (by ASTM D1238 method) is blended with 2 g of Wingtack 95 tackifying resin, and 2 g of Shellflex 371 plasticizing oil to prepare a blend having a melt viscosity of 53,000 cp at 177° C. (by Brookfield Thermosel method). Pressure-sensitive tapes made with this blend have a probe tack value of 450 g./0.5 cm diameter probe and a peel adhesion value of 3.4 pounds/inch.

Although the invention has been described in considerable detail with particular reference to certain preferred embodiments thereof, variations and modifications can be effected within the spirit and scope of the invention.

We claim:

1. An adhesive composition capable of being used as a hot-melt, pressure-sensitive adhesive comprising a blend of
   (1) about 98 to 25 weight percent of an olefin copolymer containing 10–65 mole % propylene, 15–75 mole % of either 1-butene or 1-pentene and 3 to 14 mole percent of at least one higher linear alpha-olefin of 6 to 10 carbon atoms, said copolymer having a melt viscosity of 10,000 to 1,000,000 centipoise at 190° C.,
   (2) 1 to 60 weight percent of at least one compatible tackifying resin, and
   (3) 1 to 25 weight percent plasticizing oil.

2. An adhesive composition according to claim 1 wherein said compatible tackifying resin is at least one hydrocarbon tackifying resin.

3. An adhesive composition capable of being used as a hot-melt, pressure-sensitive adhesive comprising a blend of
   (1) 90 to 30 weight percent of an olefin copolymer containing 10–65 mole % propylene, 15–75 mole % of either 1-butene or 1-pentene and 3 to 14 mole percent of at least one higher linear alpha-olefin of 6 to 10 carbon atoms, said copolymer having a melt viscosity of 16,000 to 1,000,000 centipoise at 190° C., and
   (2) 10 to 50 weight percent of at least one compatible tackifying resin selected from the group consisting of hydrocarbon resins, and polyterpene resins, and
   (3) 5 to 15 weight percent plasticizing oil.

4. An adhesive composition according to claim 3 wherein said compatible tackifying resin is at least one polyterpene resin.

5. An adhesive composition according to claim 3 wherein said compatible tackifying resin is at least one hydrocarbon resin.

6. An adhesive composition according to claim 5 wherein said hydrocarbon tackifying resin is DAC-B hydrocarbon resin.

7. An adhesive composition according to claim 5 wherein said hydrocarbon tackifying resin is Wingtack 95 hydrocarbon resin.

8. An adhesive composition according to claim 5 wherein said hydrocarbon tackifying resin is Wingtack 115 hydrocarbon resin.

9. An adhesive composition according to claim 4 wherein said polyterpene tackifying resin is Zonarez 7100 terpene hydrocarbon resin.

10. An adhesive composition according to claim 3 wherein said plasticizing oil is a member of the group consisting of paraffinic/naphthenic oils, low molecular weight oils derived from a $C_5$ hydrocarbon fraction, low molecular weight polyisobutylenes, low molecular weight liquid polymerized DAC-B oils, liquid polyterpenes and esters having a boiling point of greater than about 275° C. at 760 mm pressure derived from either aromatic or aliphatic acids.

11. An adhesive composition according to claim 4 wherein said plasticizing oil is a member of the group consisting of paraffinic/naphthenic oils, low molecular weight oils derived from a $C_5$ hydrocarbon fraction, low molecular weight polyisobutylenes, low molecular weight liquid polymerized DAC-B oils, liquid polyterpenes and esters having a boiling point of greater than about 275° C. at 760 mm pressure derived from either aromatic or aliphatic acids.

12. An adhesive composition according to claim 5 wherein said plasticizing oil is a member of the group consisting of paraffinic/naphthenic oils, low molecular weight oils derived from a $C_5$ hydrocarbon fraction, low molecular weight polyisobutylenes, low molecular weight liquid polymerized DAC-B oils, liquid polyterpenes and esters having a boiling point of greater than about 275° C. at 760 mm pressure derived from either aromatic or aliphatic acids.

13. An adhesive composition according to claim 6 wherein said plasticizing oil is a member of the group consisting of paraffinic/naphthenic oils, low molecular weight oils derived from a $C_5$ hydrocarbon fraction, low molecular weight polyisobutylenes, low molecular weight liquid polymerized DAC-B oils, liquid polyterpenes and esters having a boiling point of greater than about 275° C. at 760 mm pressure derived from either aromatic or aliphatic acids.

14. An adhesive composition according to claim 7 wherein said plasticizing oil is a member of the group consisting of paraffinic/naphthenic oils, low molecular weight oils derived from a $C_5$ hydrocarbon fraction, low molecular weight polyisobutylenes, low molecular weight liquid polymerized DAC-B oils, liquid polyterpenes and esters having a boiling point of greater than about 275° C. at 760 mm pressure derived from either aromatic or aliphatic acids.

15. An adhesive composition according to claim 8 wherein said plasticizing oil is a member of the group consisting of paraffinic/naphthenic oils, low molecular weight oils derived from a $C_5$ hydrocarbon fraction, low molecular weight polyisobutylenes, low molecular weight liquid polymerized DAC-B oils, liquid polyterpenes and esters having a boiling point of greater than about 275° C. at 760 mm pressure derived from either aromatic or aliphatic acids.

16. An adhesive composition according to claim 9 wherein said plasticizing oil is a member of the group consisting of a paraffinic/naphthenic oils, low molecular weight oils derived from a $C_5$ hydrocarbon fraction, low molecular weight polyisobutylenes, low molecular weight liquid polymerized DAC-B oils, liquid polyterpenes and esters having a boiling point of greater than about 275° C. at 760 mm pressure derived from either aromatic or aliphatic acids.

* * * * *